Patented May 13, 1930

1,758,386

UNITED STATES PATENT OFFICE

CHARLES E. F. AHLM, OF CLEVELAND, OHIO, ASSIGNOR TO THE TWIN HIGH TRANSMISSION COMPANY, OF SYRACUSE, NEW YORK, A CORPORATION OF NEW YORK

TRANSMISSION GEARING

Application filed December 18, 1924. Serial No. 756,746.

This invention relates to transmission gearing for connecting driving and driven members for transmitting various speeds from one to the other. The particular adaptation shown is for use as an auxiliary transmission in connection with certain standard types of automobiles, and the general object of the invention is the provision of a simple, strong and compact transmission unit, capable of efficiently and quietly transmitting power at different speeds.

Another object is to provide an improved and simplified change speed gearing employing internal and external gears.

Further features and objects of my invention will become apparent from the following description which relates to the accompanying drawings, wherein I have shown a preferred embodiment thereof. The essential novel characteristics will be summarized in the claims.

Figure 1:
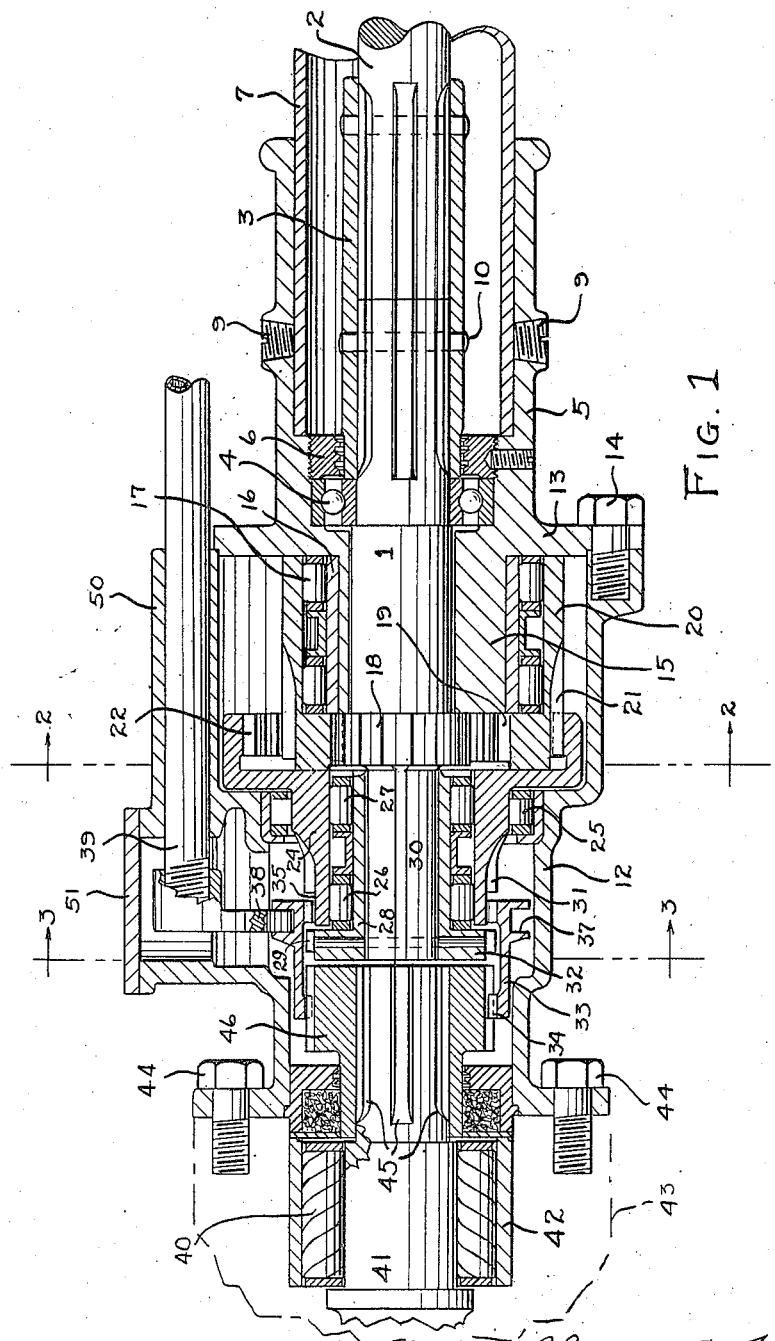
Figure 2:
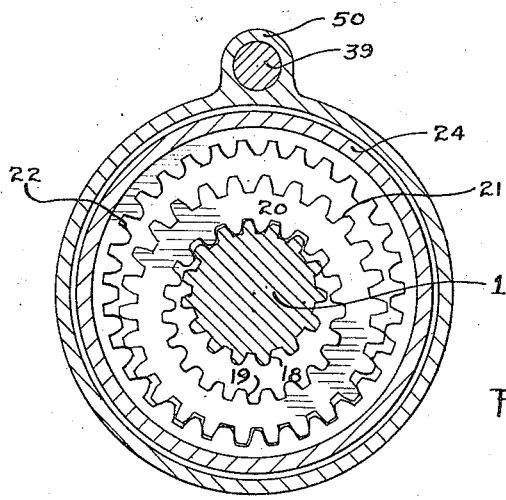
Figure 3:
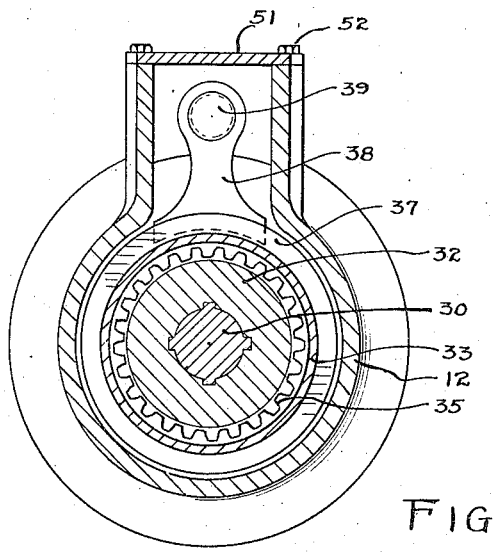

In the drawings, Fig. 1 is a substantially longitudinal central sectional view of the gearing; Fig. 2 is a transverse sectional view thereof taken along the line 2—2 of Fig. 1; Fig. 3 is a transverse sectional view as indicated by the lines 3—3 on Fig. 1.

The invention as illustrated comprises a shaft carrying external gear teeth which engage internal teeth on a hollow compound gear member supported for rotation on an eccentric axis that is fixed with relation to the gearing casing. The compound gear also has a series of external gear teeth which mesh with teeth of a tubular internal gear. Another shaft carries a dental clutch sleeve which may be moved to couple the two shafts together either directly or through the intermediacy of the gears.

Referring in detail to the drawings, 1 indicates the drive shaft which may be connected to the rearward end of a propeller shaft 2, (leading from an already existing transmission) by means of a sleeve 3. The rearward end of this composite propeller shaft is supported in anti-friction bearings 4, journalled in a casing member indicated at 13. This casing member has a forwardly projecting tubular portion 5 into which is threaded a securing nut 6 to prevent the escape of oil through the bearing 4 along the sleeve 3. A housing tube 7 also carried by the tubular section 5 is held in place by set screws 9 which may be of sufficient size to allow the removal and replacement of a pin 10 which extends through the sleeve 3 into the shaft 1 to prevent its endwise displacement.

The driven shaft 41 is supported at one end on rollers 40 in the rear end of a casing section 12 and extends to within a short distance from the drive shaft in axial alignment therewith and in fixed longitudinal relation thereto. Other bearings for the driven shaft may comprise rollers 40 carried by a sleeve 42 adapted to be supported by the differential housing indicated in broken lines at 43 to which the casing section 12 may be secured as by screws 44. The casing sections 12 and 13 may be secured together by cap screws 14.

The primary distinguishing characteristic of my gearing is that shafts such as 1 and 41 may be connected for rotation at different relative speeds through compactly arranged internal-external gears, without having to move the cooperating gears into and out of mesh, without disturbing the longitudinal relation of the shafts and without having to rotate the entire mass of gears as a unit when the shafts are connected for rotation at the same speed. Further, by the arrangement shown, the connections for both speeds which the present construction affords may be made by shifting a very simple clutch from one connection position to another, the hollow elements of the gear train permitting a direct connection between the shaft to be made through these hollow gears.

The gear train comprises gears 18 and 22 one for each shaft, the gear 18 being an external pinion rigid with the drive shaft, and the gear 22 being an internally toothed sleeve-like member rotatable about the axis of the shaft 41 and connectible to the shaft as will be presently shown, the two gears being in permanent mesh with respective internal and external teeth 19 and 21 of a hollow geared interponent or compound gear 20.

The axis of rotation of the compound hollow gear is maintained on a stationary axis by reason of a tubular eccentric member 16 rigid with the casing section 13 and which carries separated sets of rollers 17 which bear against the inner peripheral surface of the compound gear. Thus when the drive shaft is rotated the pinion drives the compound gear at a constant slower speed and the compound gear drives the internal gear 22 at a still slower speed.

The means for connecting the shaft 41 directly to the drive shaft and through the gear train comprises, as shown, a clutch sleeve 33 in splined relation to an enlargement 46 of the shaft 41, the sleeve having internal clutch teeth 34 engageable selectively with teeth 29 on a member 28 rigid on the drive shaft and with teeth 31 on the tubular hub of the gear 24. For direct drive the clutch sleeve is shifted rearwardly to cause the teeth 34 and 29 to engage, and for the reduced speed, through the gear train, the sleeve is shifted forwardly to cause the teeth 34 and 31 to engage. The sleeve may be shifted by a shipper bar 39 having a fork 38 engaging between a pair of circular flanges 37 on the sleeve. The bar may extend through a bearing portion 50 in the casing section 12 to a suitable control lever (not shown). To permit access to the clutch mechanism I have shown a cover plate 51 extending over an opening 53 in the casing and held in place by screws 52. To provide a rigid support for the rear end of the shaft 1 and for the gear 22 I have shown a single series of rollers 25 carried by the casing section 12 and directly supporting the hub of the gear, and a double series of rollers 26 and 27 between the gear hub and the shaft. The bearings 26 and 27 as shown roll against the member 28 which carries the clutch teeth of the drive shaft. Thus one member supports another against axial displacement and in compact nested arrangement.

The gearing may be easily assembled by first slipping the shaft 41 and the movable clutch sleeve into place, then assembling the clutch member 28 and shaft 1 (placing one on the other through the hub of the gear 22), then sliding the gear, shaft and clutch member into place, then assembling the compound gear and the casing section 13 and finally slipping this casing section over the forward end of the shaft 1 and securing the two casing sections together.

From the foregoing description it will be seen that I have provided a comparatively simple gearing in which all the power transmitting elements are simple to manufacture, conveniently assembled and compactly arranged, in which the operation of changing from one speed to another may be easily accomplished without disengaging any of the cooperating sets of teeth and without having to overcome a considerable amount of inertia.

Having thus described my invention, I claim:

1. In a transmission gearing in combination, a casing, a driving shaft and a driven shaft, a gear carried by one of the shafts, an intermediate driving member having a gear, a hollow geared interponent connecting the two gears and surrounding one of the shafts, an eccentric bearing therefor carried rigidly by the casing, and a dental clutch mechanism arranged to selectively connect the driven shaft directly to the driving shaft and to the intermediate driving member.

2. In a gearing two relatively rotatable coaxial gears, one having internal teeth and one external teeth, an internally and externally geared member on a fixed axis eccentric to said gears for connecting them, a shaft rigid with one of the said gears, another shaft, a clutch member drivingly rigid with the latter shaft and axially movable to two active positions, and cooperating clutch members rigid with the first named shaft and the other of said gears.

3. In a transmission gearing a pair of shafts, gear teeth drivingly rigid with one of the shafts, an intermediate power transmitting member having gear teeth rigid therewith, a hollow geared interponent arranged to connect the said gear teeth and in surrounding relation to one of the shafts to allow this shaft to project thereinto toward the other shaft, a bearing for the said interponent for supporting it on an axis eccentric to at least one of the shafts, and means drivingly rigid with one shaft and arranged to be moved to couple the shafts directly together when in one position and to couple one shaft to the said intermediate member when in another position.

4. A transmission gearing comprising in combination a driving member having a pinion, a gear, an eccentric bearing member rigid with the casing, a geared interponent carried by the eccentric bearing having teeth in mesh with both the pinion and gear, a tubular member rigid with the gear, bearings within the tubular member for supporting one end of the driving member, and an external bearing for the tubular member supported by the casing, a driven member and a clutching arrangement for coupling the driven member to the intermediate member for reduced speed and directly to the driving member for direct drive.

5. A transmission gearing comprising a shaft having a gear drivingly rigid therewith, a tubular gear member, a hollow geared interponent connecting the first named gear with the tubular gear and arranged to rotate on an axis eccentric to the shaft, a bearing interposed between the shaft and tubular gear to permit the gear to rotate relative to the shaft and to enable one to support the other, a rotatable member, and means to selectively connect the rotatable member to the tubular gear and to the shaft.

6. Transmission mechanism comprising in combination a driving member having a gear rigid therewith; a relatively stationary eccentric bearing supporting member, a bearing carried by the supporting member, an intermediate rotatable member having gear teeth, a hollow geared interponent mounted upon the eccentric bearing and surrounding said driving member, said interponent having teeth in mesh with the gear of the driving member and other teeth in mesh with the teeth of the intermediate member, a driven member, and a clutch arranged to connect the driven member with the intermediate member for one speed and to the driving member for direct drive.

7. A transmission mechanism comprising in combination a driving member, a bearing therefor, a casing, a hollow member extending therefrom and surrounding a portion of the driving member, a gear carried by the driving member adjacent the hollow member, an intermediate rotatable member having gear teeth, said member being adapted to rotate within the casing, a geared interponent eccentrically mounted upon the hollow member and having two sets of gear teeth, one set adapted to mesh with the gear, and the other with the teeth of the intermediate member, a driven member, and a clutch adapted to connect the driven member with the intermediate member for a reduced speed and directly to the driving member for direct drive.

8. In combination in a transmission gearing, a shaft, a casing, an inwardly extending tubular projection carried thereby, a rolling bearing within said projection for supporting the shaft, a pinion rigid with the shaft, an eccentric bearing carried by said inwardly extending projection, an internal-external gear supported by the bearing and in engagement with the pinion, an internal gear member having teeth in mesh with the internal-external gear member, a clutch member associated therewith, a similar clutch member rigid with the shaft, a power transmitting member and a shiftable clutch connected therewith, and means for operating said clutch to connect the power transmitting member either to the clutch member of the internal gear or to the clutch member of the shaft.

9. In a transmission gearing in combination, a driving member and a driven member, a casing, a pinion carried by the driving member, an eccentric bearing member carried rigidly within the casing, an internal-external gear carried by the bearing having teeth in mesh with the pinion, an internal gear member adapted to rotate within the casing and having teeth in mesh with the external teeth of the internal-external gear, clutch members rigid with the internal gear member and driving member respectively, and a shiftable clutch member drivingly rigid with the driven member for connecting the driven member with the internal gear for reduced speed and with the driving member for direct drive.

10. In a transmission gearing, a pair of rotatable members to be connected, a casing into which said members project, a gear drivingly rigid with one of the members, an eccentric bearing carried rigidly by the casing, a hollow compound internal and external gear carried by the bearing, one set of teeth thereof meshing with the first named gear, another gear in axial alignment with one of the shafts and in mesh with another set of teeth of the compound gear, a clutch member drivingly rigid with one of the gears, a clutch member drivingly rigid with one of the rotatable members, another clutch member drivingly rigid with the other rotatable member, and means for selectively coupling the last named clutch member to both previously mentioned clutch members.

11. In combination, a driving member, a casing, a driving gear carried by said driving member, an intermediate driving member having a gear and adapted to rotate within the casing and in axial alignment with said driving member, a compound gear having sets of teeth in mesh with the two gears respectively, an eccentric bearing therefor rigid with the casing, a clutch member carried by said driving member, a clutch member carried by the intermediate member, a driven member extending within the casing, a shiftable clutch member drivingly rigid therewith and adapted to be moved from a neutral position to engage the clutch member of the intermediate driving member for one speed and to engage the clutch member of the driving member for direct drive.

12. In a transmission gearing, a casing, a driving shaft and a driven shaft carried thereby, a gear carried by one of the shafts, an intermediate driving member having a hollow gear surrounding and in axial alignment with one of the shafts, a hollow geared interponent connecting the first named gear with the hollow gear, an eccentric bearing therefor carried rigidly by the casing, dental clutch members rigid with the hollow gear and one of the shafts respectively and a shiftable dental clutch member in splined relation to the other shaft and capable of connecting this latter shaft with either of the first named clutch members selectively, whereby the driven shaft may be driven directly by the driving shaft or at a different speed through said gearing.

13. In combination in a transmission gearing, a casing, a shaft having a pinion, an eccentric bearing, an internal-external gear supported by the bearing, in mesh with said pinion, an internal gear having a tubular portion with teeth in mesh with said internal-external gear, a bearing carried by the casing for the internal gear embracing said tubular portion, a rotatable member, a clutch member associated therewith for drivingly connecting said rotatable member with the tubular portion for reduced speed, a projection on the shaft extending through the tubular portion and clutch means carried thereby adapted to cooperate with the said first mentioned clutch member for connecting the said rotatable member directly to the shaft.

14. In a transmission gearing, the combination with a driving and a driven shaft, a pinion carried by the driving shaft, an eccentric bearing, an internal-external gear carried by the eccentric bearing, permanently in mesh with the pinion, an internal gear having a tubular extension, said internal gear being permanently in mesh with teeth of said internal-external gear, a bearing within said tubular extension, a sleeve forming part of said bearing and provided with a clutch member, a projection extending from the driving shaft within said sleeve and supported thereby, said sleeve being drivingly rigid with the driving member, and a clutch arrangement for connecting the driven shaft with said tubular extension for reduced speed and with said clutch member for direct drive.

15. In a gearing, a casing, a pair of mutually aligned shafts carried thereby in fixed relation, a gear on one of the shafts, a hollow gear member having separate sets of gear teeth one set being permanently in mesh with the said gear, and said hollow gear being in surrounding eccentric relation to one of said shafts, means including gear teeth whereby the other set of teeth may drive the other shaft, and said means including a dental clutch member in splined relation to one of the shafts and arranged to extend in telescoping relation to the other, said clutch member being arranged when in one position to effect a connection between the shafts through said gears, and when in another position to directly connect the shafts.

16. In a gearing two shafts extending in opposite directions, a hollow member rotatable on a stationary axis and having a permanent internal-external geared connection with one of the shafts, an interruptable connection between the hollow member and the other shaft including a dental clutch member drivingly rigid on this shaft and a cooperating clutch member drivingly connected to the hollow gear and means including another dental clutch member for connecting the shafts directly.

17. In a gearing, a pair of rotatable members, a gear rigid with one of the members, a gear coaxial with the other and means to connect and disconnect the latter gear and said other member, a hollow compound gear supported on a permanent stationary axis and having teeth in permanent mesh with one of the aforesaid gears, an interruptable direct connection between the said members comprising an extension of one member passing through the hollow gear and a clutch connection between the extension and the other member.

18. In a gearing, a casing, three coaxial relatively rotatable members, gears rigid with two of said members and a compound internal and external gear connecting them and constrained to rotate on a fixed axis eccentric thereto, clutch means for connecting the other member directly to each of said two members selectively, a bearing interposed between two of said members and a bearing in the casing in the region of the former bearing and directly supporting one of the last mentioned two members whereby the casing supports both these members.

19. A transmission mechanism comprising in combination a driving shaft, a coaxial driven shaft, an internal gear mounted on the driving shaft, an external gear mounted coaxially with the shafts and spaced from said internal gear, and a compound gear mounted on a fixed axis offset from the axis of the shafts, said compound gear comprising an external gear adapted to mesh with the aforesaid internal gear, and an internal gear adapted to mesh with the first mentioned external gear, together with a clutch for directly connecting the driving and driven shafts when in one position and for connecting them through the medium of the gearing when in another position.

20. In a transmission mechanism, the combination of a driving shaft, a coaxial driven shaft, a driving gear mounted on the driving shaft, a coaxial driven gear, one of said gears being internal and the other external, a compound gear drivingly associative with said gears and mounted on a fixed axis offset from the axis of said gears and shafts, and a clutch adapted to associate the driving shaft directly with the driven shaft when in one position and to associate the driving shaft with the driven shaft through the medium of the gearing when in another position.

21. In a transmission mechanism, the combination of a driving shaft, a coaxial driven shaft, a gear in driving relation with the driving shaft, a coaxial driven gear, one of said gears being internal and the other external, a compound gear drivingly associative with said gears and mounted on a fixed axis offset from the axis of said gears and shafts, and a clutch adapted to associate the driving shaft directly with the driven shaft when in one position and to associate the driving shaft with the driven shaft through the medium of the gearing when in another position.

In testimony whereof, I hereunto affix my signature.

CHARLES E. F. AHLM.